(12) United States Patent
Rignäs

(10) Patent No.: US 12,311,752 B2
(45) Date of Patent: May 27, 2025

(54) HANDLING OF FUEL VAPOUR

(71) Applicant: Ningbo Geely Automobile Research & Development Co., Ltd., Ningbo (CN)

(72) Inventor: Ronja Rignäs, Bollebygd (SE)

(73) Assignee: NINGBO GEELY AUTOMOBILE RESEARCH & DEVELOPMENT CO., LTD., Ningbo (CN)

( * ) Notice: Subject to any disclaimer, the term of this patent is extended or adjusted under 35 U.S.C. 154(b) by 0 days.

(21) Appl. No.: 17/472,669

(22) Filed: Sep. 12, 2021

(65) Prior Publication Data

US 2021/0402872 A1 Dec. 30, 2021

Related U.S. Application Data

(63) Continuation of application No. PCT/CN2020/078204, filed on Mar. 6, 2020.

(30) Foreign Application Priority Data

Mar. 18, 2019 (EP) ..................................... 19163436

(51) Int. Cl.
  *B60K 15/035* (2006.01)
  *B60H 1/00* (2006.01)
  (Continued)

(52) U.S. Cl.
  CPC ... *B60K 15/03519* (2013.01); *B60H 1/00278* (2013.01); *F02M 31/20* (2013.01);
  (Continued)

(58) Field of Classification Search
  CPC .... B60K 15/03519; B60K 2015/03414; F02M 31/20; F02M 33/08; F02M 1/165
  (Continued)

(56) References Cited

U.S. PATENT DOCUMENTS 3,783,849 A * 1/1974 Bramfitt ................. F02M 13/06
                                                        123/576
4,671,071 A * 6/1987 Sasaki .............. B60K 15/03504
                                                         96/108

(Continued)

FOREIGN PATENT DOCUMENTS

CN        103069146 A       4/2013
CN        109458276 A  *    3/2019    ............. F02M 25/08
                  (Continued)

OTHER PUBLICATIONS

International Search Report from corresponding International Application No. PCT/CN2020/078204, May 27, 2020, 3 pages.

*Primary Examiner* — Logan M Kraft
*Assistant Examiner* — Joshua Campbell
(74) *Attorney, Agent, or Firm* — Tucker Ellis LLP

(57) ABSTRACT

A system includes a fuel tank and a fuel vapour cooling arrangement connected to the fuel tank. The fuel vapour cooling arrangement is arranged to receive fuel vapour evaporated from the fuel in the fuel tank. In the fuel vapour cooling arrangement, the evaporated fuel is condensed into liquid fuel. The fuel vapour cooling arrangement is arranged outside of the fuel tank. A valve is arranged between the fuel tank and the fuel vapour cooling arrangement to control the opening and closing of the connection between the fuel tank and the fuel vapour cooling arrangement.

15 Claims, 5 Drawing Sheets

(51) Int. Cl.
*F02M 31/20* (2006.01)
*F02M 33/08* (2006.01)
*H01M 10/613* (2014.01)
*H01M 10/663* (2014.01)
*B60K 15/03* (2006.01)

(52) U.S. Cl.
CPC .......... *F02M 33/08* (2013.01); *H01M 10/613* (2015.04); *H01M 10/663* (2015.04); *B60K 2015/03256* (2013.01)

(58) Field of Classification Search
USPC ....................................................... 123/541
See application file for complete search history.

(56) References Cited

U.S. PATENT DOCUMENTS

| | | | | |
|---|---|---|---|---|
| 5,641,005 | A * | 6/1997 | Kountz | F17C 5/06 141/3 |
| 6,311,649 | B1 * | 11/2001 | Ma | F02M 31/18 123/3 |
| 6,526,950 | B2 * | 3/2003 | Ito | F02M 25/12 123/541 |
| 9,050,885 | B1 | 6/2015 | Dudar | |
| 2008/0250804 | A1 * | 10/2008 | Kubo | F17C 5/007 165/44 |
| 2009/0031996 | A1 | 2/2009 | Chung | |
| 2009/0031997 | A1 | 2/2009 | Makino | |
| 2015/0158377 | A1 * | 6/2015 | Dudar | B60K 11/085 903/904 |
| 2017/0107954 | A1 * | 4/2017 | Kopinsky | B60K 15/03504 |

FOREIGN PATENT DOCUMENTS

| | | | | |
|---|---|---|---|---|
| DE | 10001434 | A1 | 8/2001 | |
| DE | 10001434 | B4 * | 3/2012 | ............. F02M 31/20 |
| DE | 102011003811 | A1 | 8/2012 | |
| DE | 102013107837 | A1 | 1/2015 | |
| EP | 936097 | A1 * | 8/1999 | ....... B60K 15/03504 |
| EP | 2562408 | A1 | 2/2013 | |
| FR | 2996880 | A1 * | 4/2014 | .......... F02M 25/089 |
| JP | 2010190210 | A | 9/2010 | |

* cited by examiner

HANDLING OF FUEL VAPOUR

RELATED APPLICATION DATA

This application is a continuation of International Patent Application No. PCT/CN2020/078204, filed Mar. 6, 2020, which claims the benefit of European Patent Application No. 19163436.9, filed Mar. 18, 2019, the disclosures of which are incorporated herein by reference in their entireties.

TECHNICAL FIELD

The disclosure relates to a system and a method for the handling of fuel vapour in a fuel tank of a vehicle.

BACKGROUND

In a fuel tank of a vehicle, fuel vapour can for instance be generated during refueling or when fuel is heated due to that the vehicle stands in the sun. The fuel vapours need to be removed from the tank in order for the pressure inside the tank to not exceed a design pressure. However, the fuel vapours cannot be vented directly into the atmosphere, causing pollution, due to emission regulations.

Evaporative emission canister (also referred to as carbon canisters or charcoal canisters) are normally connected to the fuel tank of a vehicle to absorb fuel vapour that would otherwise vent out to the atmosphere. Evaporative emission canisters continue to grow in size in order to increase their capacity to absorb fuel vapour because of increasingly stricter emission regulations all around the world. The continual increase in size causes problems as the evaporative emission canisters are expensive and take up space that could be used for other purposes.

DE 102011003811 A1 discloses a fuel delivery device which is arranged to condense fuel vapour inside the fuel tank before the fuel vapour reaches the carbon canister. A cooling unit is arranged inside the fuel tank and is arranged to condense fuel vapour before they leave the inside of the tank. The condensed fuel is stored in a separate collecting volume and is supplied to the engine as soon as possible in order to avoid re-condensing of already condensed fuel. This device reduces the amount of fuel vapour accumulated in the carbon canister and allows for increased flushing with fresh air, also at low engine loads. The cooling unit in DE 102011003811 A1 can be arranged, for example, on a tank flange.

SUMMARY

An objective of the disclosure is to provide a system that improves the handling of fuel vapour present in a fuel tank of a vehicle. The objective is achieved by a system comprising a fuel tank and a fuel vapour cooling arrangement connected to the fuel tank. The fuel vapour cooling arrangement is arranged to receive fuel vapour evaporated from the fuel in the fuel tank. In the fuel vapour cooling arrangement, the evaporated fuel is condensed into liquid fuel. The fuel vapour cooling arrangement is arranged outside of the fuel tank. A valve is arranged between the fuel tank and the fuel vapour cooling arrangement to control the opening and closing of a connection between the fuel tank and the fuel vapour cooling arrangement. By having the fuel vapour cooling arrangement arranged outside of the fuel tank and equipped with a valve arranged between the fuel tank and the fuel vapour cooling arrangement that controls the opening and closing of the connection between the fuel tank and the fuel vapour cooling arrangement, the fuel vapour cooling arrangement can be designed such that the emission regulations can be fulfilled without the need of a carbon canister. This system is also less mechanically complex and can be installed on vehicles without having to replace or redesign the fuel tank. The system is a less complex and less expensive system that handles fuel vapour evaporated from the fuel while still meeting or exceeding emission regulation requirements. The fuel delivery device of DE 102011003811 A1 requires a major reconstruction of the fuel tank in order to fit the fuel delivery device inside the fuel tank and it is therefore advantageous with a system according to the disclosure.

A system according to the disclosure can be adapted to comply with emission regulations according to at least emission standards China 6a/b, Low Emission Vehicle III and/or Euro 6b-Euro 6d.

The fuel vapour cooling arrangement can for instance be a non-cyclic refrigeration arrangement, a cyclic refrigeration arrangement such as a vapour-compression refrigeration system, a heat exchanger arranged to exchange heat with a fluid colder than the fuel vapour or a thermoelectric refrigeration system.

According to an embodiment, the system comprises a valve arrangement connected to an outlet of the fuel vapour cooling arrangement and to the fuel tank, arranged to return the liquid fuel to the fuel tank. The valve arrangement allows for closing of the fuel vapour cooling arrangement in order to control the time used for cooling a specific volume of fuel vapour to ensure that the volume is condensed. The valve arrangement can also control when and how much condensed liquid fuel that is returned to the fuel tank.

According to an embodiment, the valve arrangement is arranged to be connected to an internal combustion engine of the vehicle, wherein the valve arrangement may be arranged to selectively return the liquid back to the fuel tank or purge the liquid fuel to the internal combustion engine. Depending on e.g. engine conditions, current fuel level in the fuel tank or whether the engine is running or is inactive, the valve arrangement can selectively purge the liquid fuel directly to the engine or return it to the fuel tank. This selective operation of the valve arrangement is useful for instance in situations where the vehicle has stood in the sun for some time and fuel vapour has evaporated from the fuel in the fuel tank. When the vehicle is started and the fuel has condensed in the fuel vapour cooling arrangement, the fuel can be purged directly to the engine instead of being returned to the fuel tank. Liquid fuel in the fuel vapour cooling arrangement can also be purged to the engine when there is a demand for a temporary increase in fuel consumption, for instance during acceleration.

According to an embodiment, the valve arrangement comprises a three-way valve or a separate return valve and purge valve. Hereby, the construction alternatives allow for a flexible installation of the valve arrangement depending on the space available and the desired control of the operation of the valve arrangement.

According to an embodiment, the system further comprises an evaporative emission canister arranged between an outlet of the fuel vapour cooling arrangement and the fuel tank. An evaporative emission canister can be installed in order to ensure that any gaseous hydrocarbons still present after the fuel vapour has passed the fuel vapour cooling arrangement is captured. This allows for an adaption of the system in order to meet country specific emission regulations that may be harsher than in other countries or to adapt a vehicle for temperature conditions that lie outside the design temperature of the system without the evaporative emission canister. Also, during refuelling, the fuel vapour caused by the increased pressure in the fuel tank may need to be cleaned by the evaporative emission canister before depressurization by venting the cleaned vapour can take place. This canister can be made significantly smaller than the ones used today, still leading to a compact and less complex system.

According to an embodiment, the fuel vapour cooling arrangement is arranged to be connected to at least one of the vehicle's other cooling arrangements. In this way, the use of a cooling method or cooling medium already present in the vehicle can be used. The vehicle's cooling arrangements are for instance the air conditioning cooling arrangement or a battery cooling arrangement.

A further objective of the disclosure is to provide a vehicle comprising a system that improves the handling of fuel vapour that are present in a fuel tank of a vehicle.

According to an embodiment, the fuel vapour cooling arrangement of the system is arranged as a cooling arrangement independent from the vehicle's other cooling arrangements. In this way, the fuel vapour cooling arrangement can be designed either with a specific cooling method according the above or if vapour-compression refrigeration is used, with a cooling medium specifically adapted for the fuel vapour cooling arrangement in order to achieve the desired cooling power.

According to an embodiment, the fuel vapour cooling arrangement of the system is connected to the vehicle's air conditioning cooling arrangement and/or to the vehicle's battery cooling arrangement. In this way, the use of a cooling method or cooling medium already present in the vehicle can be used. The vehicle's cooling arrangements are for instance the air conditioning cooling arrangement or a battery cooling arrangement.

A further objective of the disclosure is to provide a method for handling fuel vapour in a fuel tank of a vehicle. This is achieved by a method, wherein a fuel vapour cooling arrangement is connected to the fuel tank and arranged outside of the fuel tank, and the method comprises:
  receiving fuel vapour in the fuel vapour cooling arrangement evaporated from fuel in the fuel tank,
  condensing the fuel vapour to liquid fuel in the fuel vapour cooling arrangement,
  controlling the opening and closing of a connection between the fuel tank and the fuel vapour cooling arrangement by means of a valve arranged between the fuel tank and the fuel vapour cooling arrangement.

The method provides as an advantage, a way to easier handle fuel vapour in a fuel tank of a vehicle. The method enables a less complex and less expensive method than is known today.

According to an embodiment, a valve arrangement is connected to an outlet of the fuel vapour cooling arrangement and to the fuel tank, and the method further comprises
  selectively returning the liquid fuel back to the fuel tank by means of the valve arrangement.

According to an embodiment, the valve arrangement is connected to an internal combustion engine of the vehicle, wherein the method further comprises:
  returning the liquid fuel back to the fuel tank or purging the liquid to the internal combustion engine by means of selectively operating the valve arrangement.

According to an embodiment, the method further comprises:
  capturing any fuel vapour not condensed in the fuel vapour cooling arrangement in an evaporative emission canister arranged between an outlet of the fuel vapour cooling arrangement and the fuel tank.

According to an embodiment, the method further comprises:
  condensing the evaporated fuel only by cooling the fuel vapour, or
  condensing the evaporated fuel by cooling the fuel vapour and by pressurising either a cooling medium in the fuel vapour cooling arrangement or by pressurising the fuel vapour.

This allows for a flexible implementation of the method and for an adaption of the method depending on the desired cooling power. By pressurising the cooling medium in the fuel vapour cooling arrangement or by pressurising the fuel vapour, the cooling power can be increased relative to a method in which only cooling the fuel vapour is used.

According to an embodiment, the fuel vapour cooling arrangement is connected to the vehicle's air conditioning cooling arrangement and/or to the vehicle's battery cooling arrangement, wherein the method further comprises heat exchange of the fuel vapour with a cooling fluid of the vehicle's air conditioning cooling arrangement and/or the vehicle's battery cooling arrangement. In this way, use of existing cooling arrangement can be used for the fuel vapour cooling arrangement and no additional separate cooling arrangement needs to be installed.

Further features and advantages of the disclosure will become apparent when studying the appended claims and the following description.

The skilled person in the art realizes that different features of the present disclosure may be combined to create embodiments other than those described hereinabove, without departing from the scope of the present disclosure.

With reference to the appended drawings, below follows a more detailed description of example embodiments of the disclosure.

DETAILED DESCRIPTION

Arrows in the figures are intended to illustrate the flow of fuel vapour and liquid fuel in the system. Solid arrows indicate liquid fuel and dashed arrows indicate fuel vapour. A dash-dot arrow indicates vapour that is vented to atmosphere after being cleaned from hydrocarbons or other polluting gases.

Figure 1:
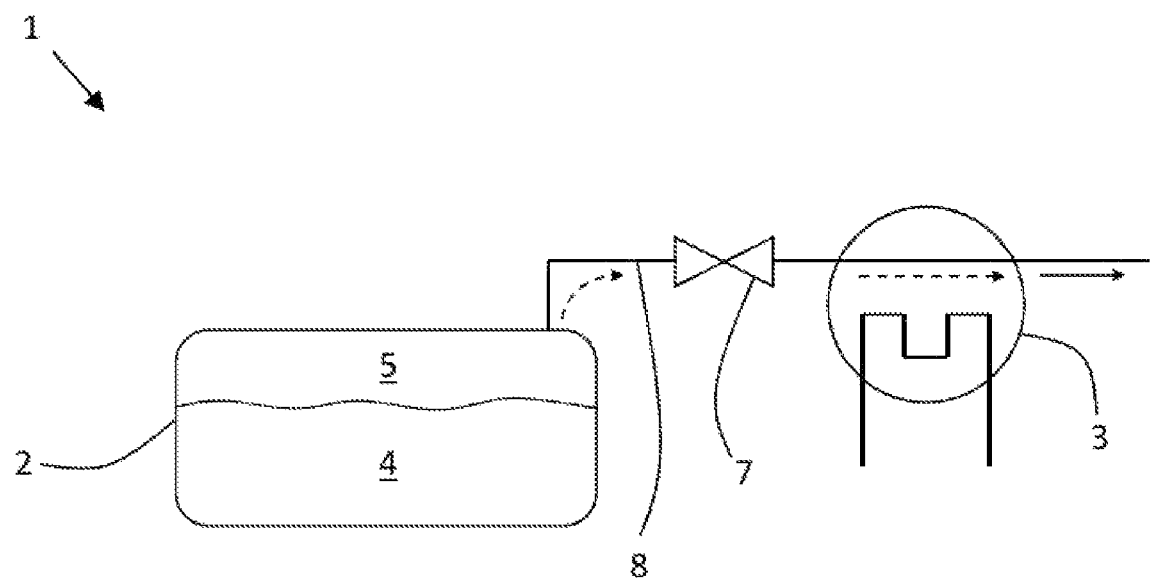
FIG. 1 schematically shows a system for handling fuel vapour in a fuel tank of a vehicle according to a first example embodiment, FIG. 2 schematically shows a system for handling fuel vapour in a fuel tank of a vehicle according to a second example embodiment, FIG. 3 schematically shows a system for handling fuel vapour in a fuel tank of a vehicle according to a third example embodiment.

FIG. 1 schematically shows a system 1 for handling fuel vapour 5 in a fuel tank 2 of a vehicle according to a first example embodiment. The system 1 comprises a fuel tank 2 and a fuel vapour cooling arrangement 3 connected to the fuel tank 2. Inside the fuel tank 2, fuel 4 and fuel vapour 5 are present. The fuel vapour cooling arrangement 3 is represented in the figures as a generic cooler. This is to be seen as an example only and is not limiting to the implementation of the fuel vapour cooling arrangement 3.

The fuel vapour cooling arrangement 3 is arranged to receive fuel vapour 5 evaporated from the fuel 4 in the fuel tank 2. Inside the fuel vapour cooling arrangement 3, the fuel vapour 5 is condensed into liquid fuel by lowering the temperature of the fuel vapour to at least its condensation temperature. The fuel vapour cooling arrangement 3 is arranged outside of the fuel tank 2 in order to provide a system 1 that is easily designed and installed and that does not require a specially designed fuel tank 2. A valve 7 is arranged between the fuel tank 2 and an inlet 3a of the fuel vapour cooling arrangement 3 to control the opening and closing of a fuel vapour cooling arrangement connection 8 between the fuel tank 2 and the fuel vapour cooling arrangement 3. This valve 7 is any valve that can be opened and closed by the vehicle's software. One example of such a valve is a fuel tank isolation valve (FTIV). The valve is for instance opened during refueling to release fuel vapour 5 from the fuel tank 2 in order to prevent pressure build-up in the fuel tank. Generally, the valve is controlled by a pressure sensor, both when the vehicle is running and when the vehicle is not running. The valve is also arranged to open during leak diagnostics. The implementation of such valves is well known and will not be described further.

Figure 2:
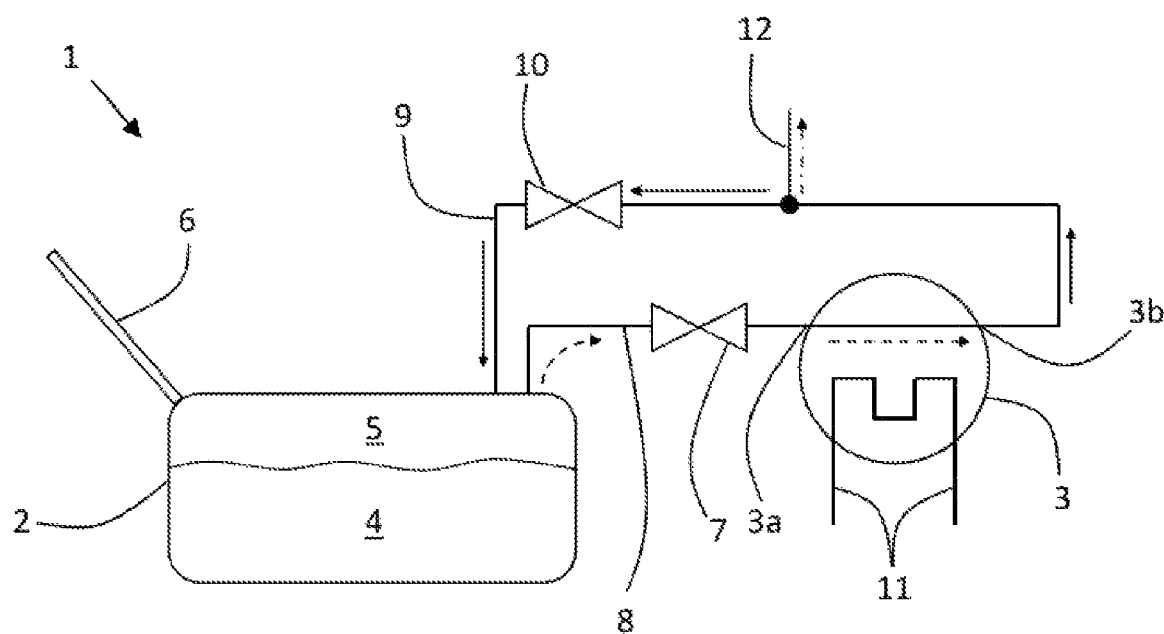

FIG. 2 schematically shows a system 1 for handling fuel vapour 5 in a fuel tank 2 of a vehicle according to a second example embodiment. FIG. 2 shows the system 1 of FIG. 1 with the addition that the condensed liquid fuel is returned to the fuel tank 2 from the fuel vapour cooling arrangement 3. The valve 7 is arranged between the fuel tank 2 and an inlet 3a of the fuel vapour cooling arrangement 3.

The condensed liquid fuel is in one example arranged to be returned to the fuel tank 2 via a fuel tank connection 9 debouching on top of the fuel tank 2. A valve arrangement 10 is arranged between the fuel vapour cooling arrangement 3 and the fuel tank 2 and is connected to an outlet 3b of the fuel vapour cooling arrangement 3. The valve arrangement 10 can be used to control the return of the liquid fuel from the fuel vapour cooling arrangement 3 to the fuel tank 2. The valve 7 and the valve arrangement 10 are preferably arranged to be connected to the vehicle's control system in order to control the opening and closing of the fuel vapour cooling arrangement connection 8 between the fuel tank 2 and the fuel vapour cooling arrangement 3 and the opening and closing of the fuel tank connection 9 between the fuel vapour cooling arrangement 3 and the fuel tank 2.

The fuel vapour cooling arrangement 3 is arranged to cool the fuel vapour 5 received from the fuel tank 2 to at least its condensation temperature. The cooling can be made by a refrigeration arrangement such as for instance a non-cyclic refrigeration arrangement, a cyclic refrigeration arrangement such as a vapour-compression refrigeration system, a heat exchanger arranged to exchange heat with a fluid colder than the fuel vapour or a thermoelectric refrigeration system. Other cooling methods can also be applicable.

The fuel vapour cooling arrangement 3 comprises a cooling connection 11. The cooling connection 11 is arranged to be connected to for instance a vapour-compression refrigeration system, wherein the fuel vapour exchanges heat with the cooling medium of the vapour-compression refrigeration system. The cooling connection 11 can alternatively be arranged to be connected to a cooling fluid of the vehicle's air conditioning cooling arrangement and/or the vehicle's battery cooling arrangement. In the latter case, the fuel vapour 5 exchanges heat with a cooling fluid of the vehicle's air conditioning cooling arrangement and/or the vehicle's battery cooling arrangement.

The fuel vapour cooling arrangement 3 is in one example embodiment a tube or a pipe made of a material that has a high thermal conductivity, for instance a metal pipe such as an aluminum, steel or copper pipe. Around the tube or pipe, the cooling connection 11 is wrapped in order to exchange heat between the fuel vapour 5 inside the tube or pipe and the cooling medium inside the cooling connection 11. The cooling connection 11 is also made of a material with high thermal conductivity.

In order to increase the cooling power of the fuel vapour cooling arrangement 3, the cooling medium in the fuel vapour cooling arrangement 3 or the fuel vapour 5 can be pressurized.

A desired target cooling temperature of the liquid fuel emerging from the fuel vapour cooling arrangement is between −20° C.--45° C.

In order to control the pressure within the system, an atmospheric vent connection 12 is attached to the system 1. The atmospheric vent connection 12 allows for gases where hydrocarbons have been removed to vent to atmosphere in order to prevent a pressure build up in the system 1, for instance during refueling where pressure inside the fuel tank 2 would otherwise increase to undesired levels. It is to be understood that the atmospheric vent connection 12 is present also in the system described in conjunction with FIG. 1, although it is omitted therein for simplicity.

Figure 3:
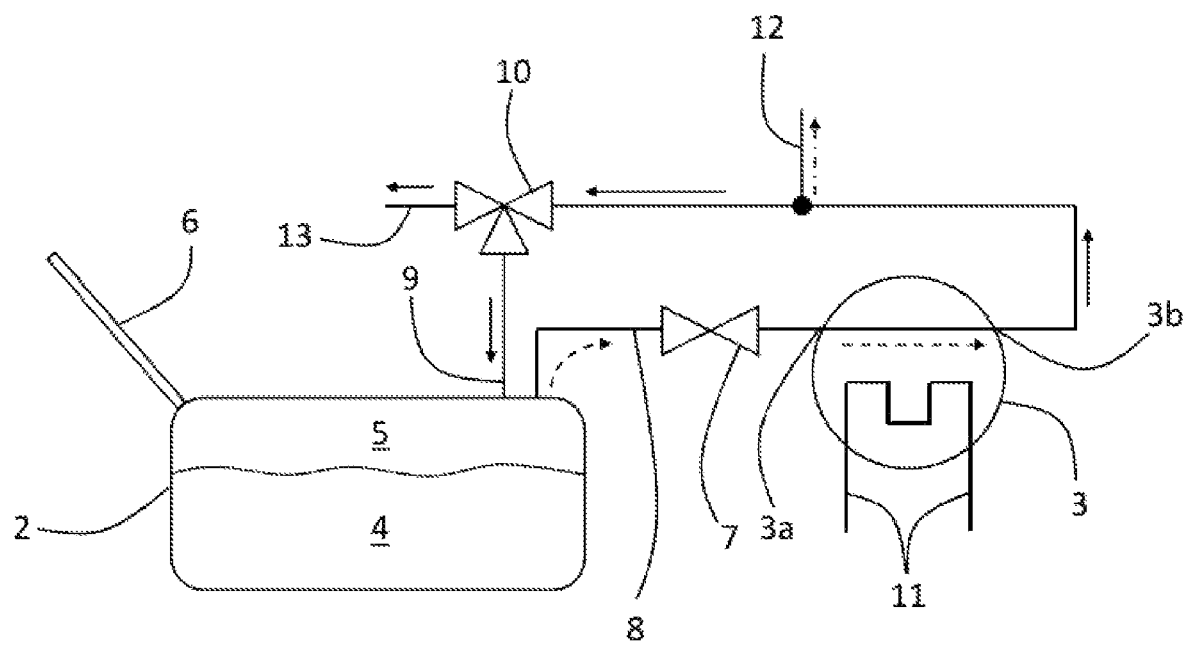

FIG. 3 schematically shows a system 1 for handling fuel vapour in a fuel tank 2 of a vehicle according to a third example embodiment. The difference between the second and the third example embodiments is that the valve arrangement 10 is a three-way valve arranged to be connected to an engine of the vehicle through an engine connection 13. The valve arrangement 8 is in this embodiment arranged to selectively return the liquid fuel to the fuel tank 2 or to the engine. The operation of the valve arrangement 10 to control the destination of the liquid fuel is controlled by the vehicle's control system.

Figure 4:
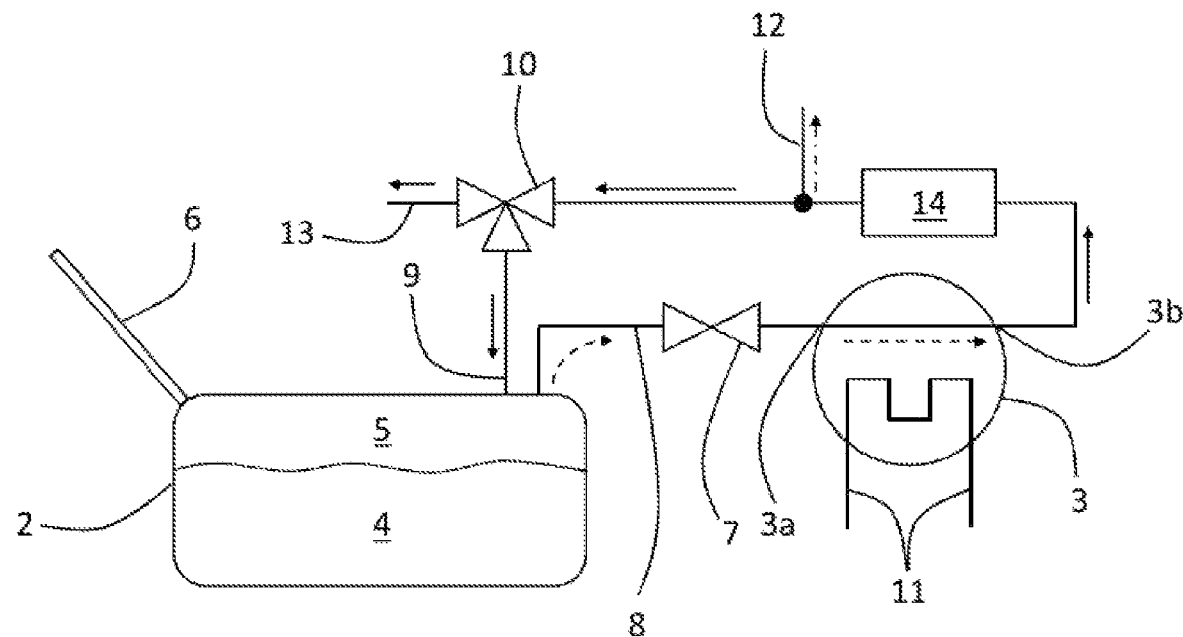
FIG. 4 schematically shows a system for handling fuel vapour in a fuel tank of a vehicle according to a fourth example embodiment.

FIG. 4 schematically shows a system 1 for handling fuel vapour in a fuel tank 2 of a vehicle according to a fourth example embodiment. The difference between the second and third embodiment is that the system 1 comprises an evaporative emission canister 14 arranged between the fuel vapour cooling arrangement 3 and the valve arrangement 10. The evaporative emission canister 14 is arranged to capture the hydrocarbons in any fuel vapour that may not have been condensed in the fuel vapour cooling arrangement 3, for instance in order to ensure that emission regulations are met. The evaporative emission canister 14 can also be used as a safeguard to ensure that no fuel vapour risks being vented to atmosphere in case the vehicle is exposed to conditions that the fuel vapour cooling arrangement 3 was not initially designed for, for instance if it is exported to a country with a higher average temperature than it was initially produced for.

As an example, a vehicle without a system according to the disclosure may require an evaporative emission canister having a carbon content of 2.7 liters. In a vehicle comprising a system according to the disclosure, and that requires the additional capacity that an evaporative emission canister offers, the carbon content of the evaporative emission canister may be less than 1 liter, specifically less than 0.5 liters and more specifically less than 0.25 liters. The carbon in the evaporative emission canister may be granulated, in the shape of pellets or as a honeycomb structure.

Figure 5:
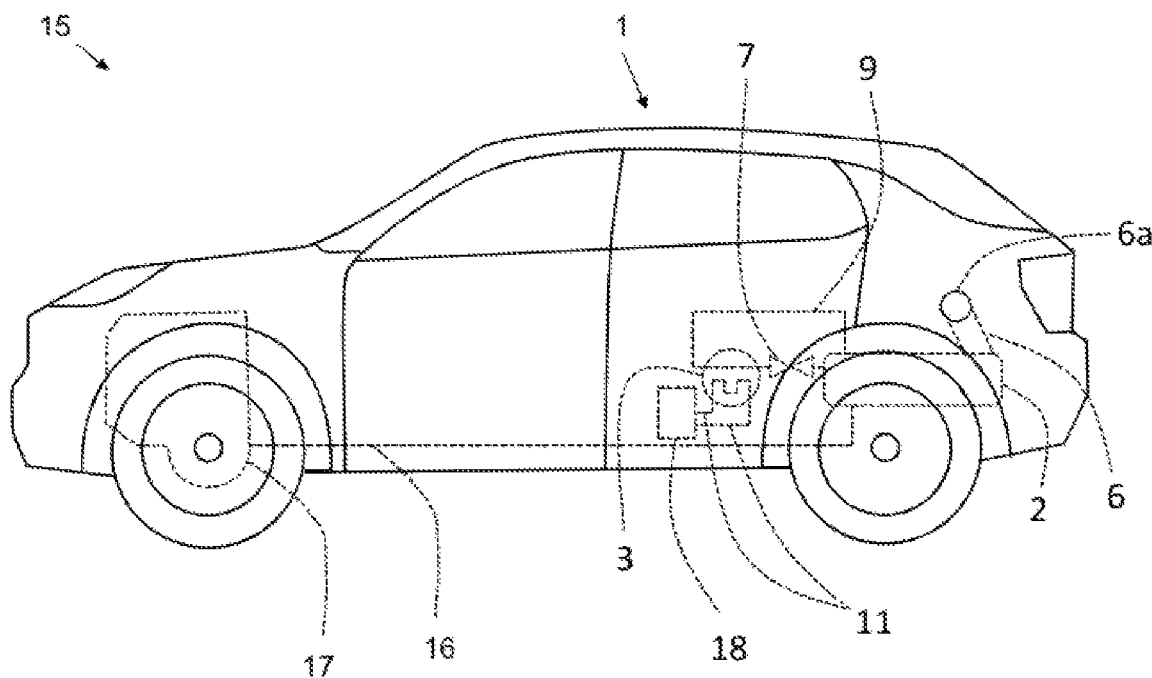
FIG. 5 schematically shows a vehicle comprising a system for handling fuel vapour in a fuel tank of a vehicle according to a first example embodiment.
Figure 6:
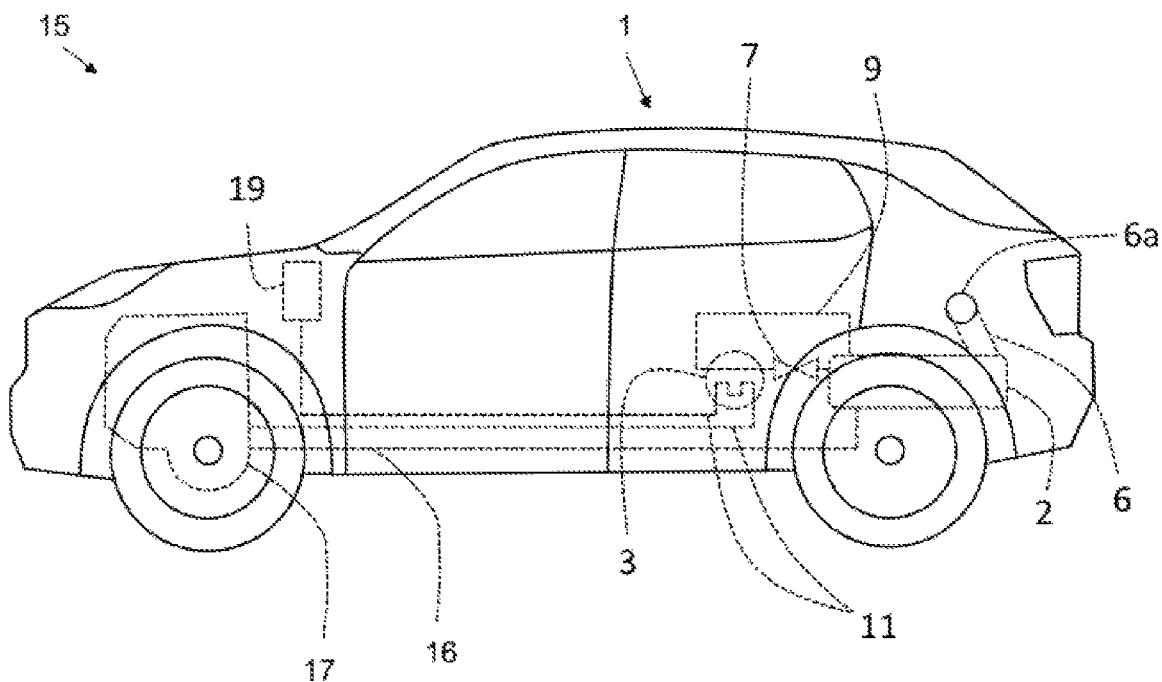
FIG. 6 schematically shows a vehicle comprising a system for handling fuel vapour in a fuel tank of a vehicle according to a second example embodiment.
Figure 7:
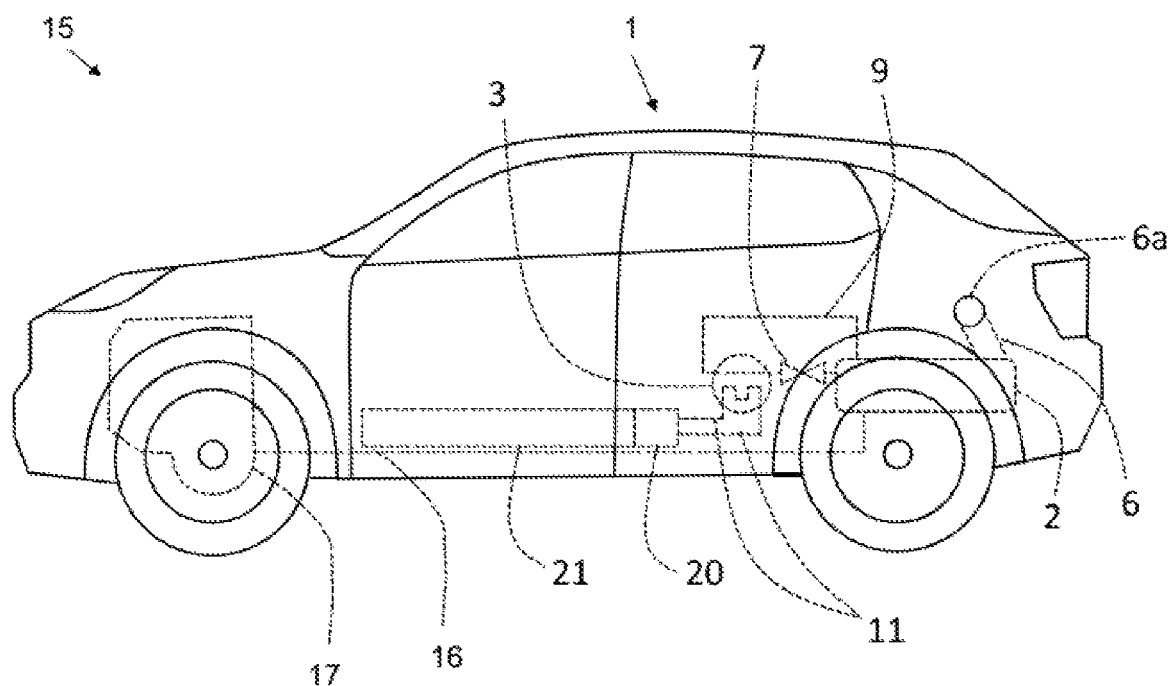
FIG. 7 schematically shows a vehicle comprising a system for handling fuel vapour in a fuel tank of a vehicle according to a third example embodiment.

FIGS. 5-7 schematically shows a vehicle 15 comprising a system 1 for handling fuel vapour 5 in a fuel tank 2 of the vehicle according to different example vehicle embodiments. In FIGS. 5-7, only the fuel tank 2, the valve 7, the fuel vapour cooling arrangement 3 and fuel tank connection 9 are seen. Also, the filler pipe 6 connected to the filler cap 6*a* is shown. It is to be understood that the vehicle 15 can be equipped with a system 1 according to any one of the example embodiments described in conjunction with FIGS. 1-4.

FIG. 5 schematically shows a vehicle 15 comprising a system 1 for handling fuel vapour 5 in a fuel tank 2 of the vehicle according to a first example vehicle embodiment. A fuel line 16 runs from the fuel tank 2 to an internal combustion engine 17 of the vehicle 15. A refrigeration arrangement 18 is connected to the cooling connection 11 in order to supply the fuel vapour cooling arrangement with cooling. The refrigeration arrangement 18 can be any one of the above described.

FIG. 6 schematically shows a vehicle comprising a system for handling fuel vapour in a fuel tank of a vehicle according to a second example vehicle embodiment. In FIG. 6, the cooling connection 11 of the fuel vapour cooling arrangement 3 is connected to the vehicle's air conditioning cooling arrangement, in this example an air conditioning evaporator 19. The air conditioning evaporator 19 supplies the fuel vapour cooling arrangement 11 with cooling fluid via a supply line 19*a*. The cooling fluid is returned to a compressor (not shown) arranged at the combustion engine 17 via a return line 19*b*. The remaining parts of the air conditioning cooling arrangement are known and not shown in FIG. 6. The air conditioning cooling arrangement is adapted to be able to supply the additional volume of cooling fluid required to cool the fuel vapour 5 in the fuel vapour cooling arrangement 3 in addition to the cooling power needed for normal air conditioning.

Alternatively, other parts of the air conditioning cooling arrangement can be connected to the fuel vapour cooling arrangement 3 to supply cooling fluid to the fuel vapour cooling arrangement 3. Also, a separate evaporator connected to the air conditioning cooling arrangement that is specifically designed to supply cooling fluid to the fuel vapour cooling arrangement 3 can be installed in the air conditioning cooling arrangement.

FIG. 7 schematically shows a vehicle comprising a system for handling fuel vapour in a fuel tank of a vehicle according to a third example vehicle embodiment. In FIG. 6, the cooling connection 11 of the fuel vapour cooling arrangement 3 is connected to the vehicle's battery cooling arrangement 20, which is arranged to cool the battery pack 21 of the vehicle 15. The vehicle's battery cooling arrangement 20 supplies the fuel vapour cooling arrangement 11 with cooling fluid or refrigeration of another kind according to the refrigeration method used by the vehicle's battery cooling arrangement 20. In case the battery cooling arrangement 20 supplies the fuel vapour cooling arrangement 20 with cooling fluid, the cooling fluid is returned to the battery cooling arrangement 20 after having exchanged heat with the fuel vapour. The battery cooling arrangement 20 is adapted to be able to supply the additional cooling power required to cool the fuel vapour 5 in the fuel vapour cooling arrangement 3 in addition to the cooling power needed to cool the battery pack 21.

The vehicle of FIGS. 5-7 can be equipped with only an internal combustion engine or can be a hybrid vehicle. In case the vehicle is a hybrid vehicle, it can be a mild hybrid vehicle, a full hybrid vehicle or a plug-in hybrid vehicle. The combustion engine can be run on petrol, diesel or a flexible fuel. It is to be understood that the atmospheric vent connection 12 is present for all embodiments of the vehicle 15.

Figure 8:
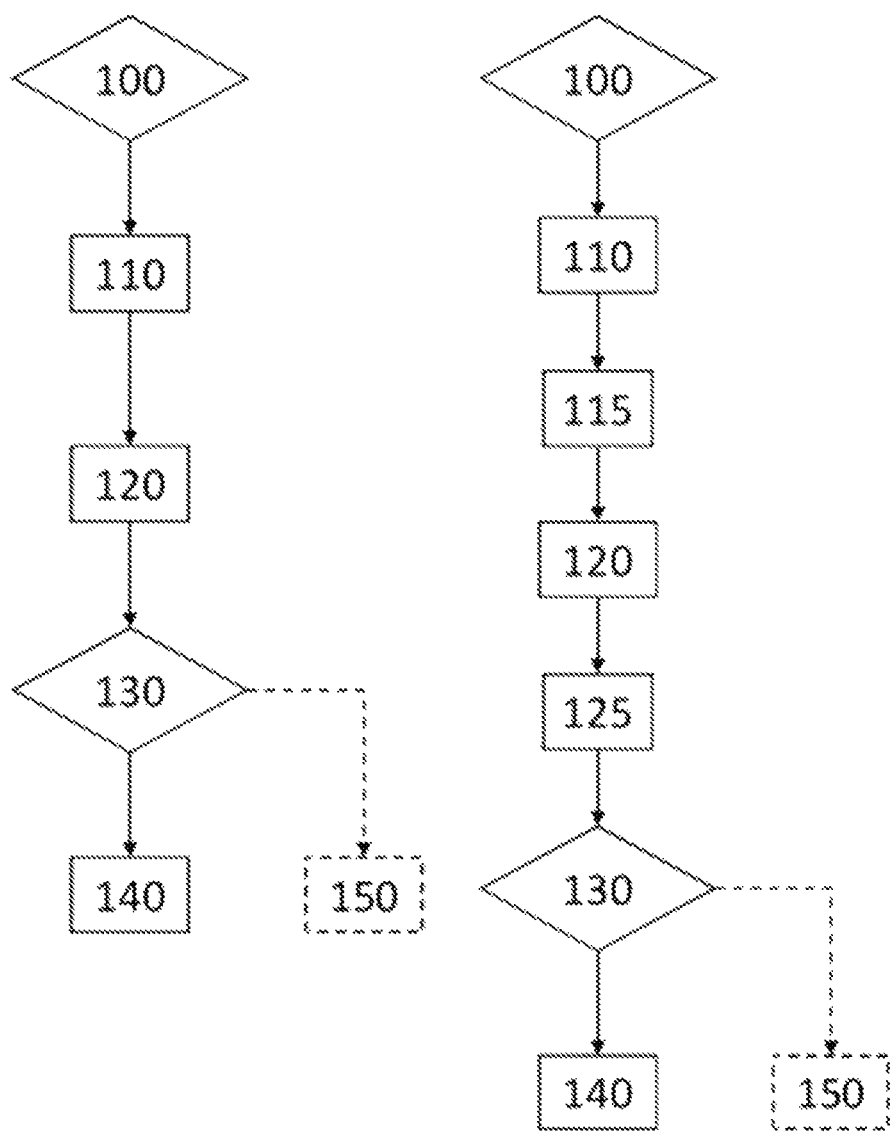
FIG. 8 schematically shows a flowchart of a method for handling fuel vapour in a fuel tank of a vehicle.

FIG. 8 schematically shows flowcharts of a method for handling fuel vapour 5 in a fuel tank 2 of a vehicle 15.

In FIG. 8 (left-hand side), the flowchart starts with decision step 100 wherein the valve 7 opens the fuel vapour cooling arrangement connection 8 between the fuel tank 2 and the fuel vapour cooling arrangement 3. In step 110, fuel vapour 5 evaporated from the fuel 4 in the fuel tank 2 is received in the fuel vapour cooling arrangement 3. In step 120, the fuel vapour 5 is condensed to liquid fuel in the fuel vapour cooling arrangement 3. These steps describe the most general aspects of the method. One or more of the following steps can be added to the method to provide further functionality to the method.

In decision step 130, the valve arrangement 10 can open or close to return the liquid fuel back to the fuel tank 2. In step 140, the liquid fuel is returned back to the fuel tank 2. Optionally, as indicated by the dashed lines in the flowchart, in step 150, the valve arrangement 10 can selectively purge the liquid to the internal combustion engine 17 in addition to return the liquid fuel back to the fuel tank 2.

FIG. 8 (right-hand side) shows a flowchart according to an alternative method for handling fuel vapour in a fuel tank of a vehicle. Normally, the evaporated fuel is condensed by only cooling the fuel vapour. In case additional cooling power is needed, the cooling medium in the fuel vapour cooling arrangement 3 or the fuel vapour is pressurized in step 115.

Further, in the method of FIG. 8 (right-hand side), an evaporative emission canister 14 is installed in the system 1. Any fuel vapour not condensed in the fuel vapour cooling arrangement 3 is captured in step 125 in the evaporative emission canister 14.

Although the disclosure has been illustrated and described in detail in the drawings and foregoing description, such illustration and description are to be considered illustrative or exemplary and the disclosure is not limited to the disclosed embodiments. For instance, the evaporative emission canister 14 can be used with any embodiment, e.g. in the embodiments where the valve arrangement 10 is only connected to the fuel tank 2.

What is claimed is:

1. A system for handling fuel vapour in a vehicle, wherein the system comprises:
   a fuel tank,
   a fuel vapour cooling arrangement connected to the fuel tank, arranged to receive fuel vapour that is evaporated from fuel that is present inside of the fuel tank, in which the evaporated fuel remains fuel vapor until it is condensed into liquid fuel within the fuel vapour cooling arrangement, wherein the fuel vapour cooling arrangement is arranged outside of the fuel tank,
   a valve is arranged between the fuel tank and the fuel vapour cooling arrangement to control the opening and closing of a fuel vapour cooling arrangement connection between the fuel tank and the fuel vapour cooling arrangement, and a valve arrangement connected to an outlet of the fuel vapour cooling arrangement to selectively return the liquid fuel back to the fuel tank or to purge the liquid fuel to an internal combustion engine, wherein the liquid fuel is selectively purged to the internal combustion engine when there is a demand for an increase in fuel consumption by the internal combustion engine;

wherein the system is configured to condense the evaporated fuel by cooling the fuel vapour in the fuel vapour cooling arrangement, the cooling is implemented at least in part by a vapour-compression refrigeration system comprising a cooling medium, and wherein increasing an amount of cooling of the fuel vapour comprises increasing a pressure of the cooling medium in the fuel vapour cooling arrangement.

2. The system according to claim 1, wherein the valve arrangement comprises a three-way valve or a separate return valve and purge valve.

3. The system according to claim 1, wherein the system further comprises an evaporative emission canister arranged between the outlet of the fuel vapour cooling arrangement and the fuel tank.

4. The system according to claim 1, wherein the fuel vapour cooling arrangement is arranged to receive coolant from a separate cooling arrangement of the vehicle.

5. A vehicle comprising the system according to claim 1.

6. The vehicle according to claim 5, wherein the fuel vapour cooling arrangement of the system is arranged as a cooling arrangement independent from a separate cooling arrangement of the vehicle.

7. The vehicle according to claim 5, wherein the fuel vapour cooling arrangement of the system is connected to at least one of an air conditioning cooling arrangement of the vehicle or a battery cooling arrangement of the vehicle.

8. A method for handling fuel vapour in a fuel tank of a vehicle, wherein a fuel vapour cooling arrangement is connected to the fuel tank and arranged outside of the fuel tank, wherein the method comprises:

receiving, from the fuel tank, fuel vapour in the fuel vapour cooling arrangement that is evaporated from fuel that is present inside of the fuel tank, the evaporated fuel remains as fuel vapor until received by the fuel vapour cooling arrangement, condensing the fuel vapour to liquid fuel in the fuel vapour cooling arrangement by cooling the fuel vapour in the fuel vapour cooling arrangement and increasing an amount of cooling of the fuel vapour either by increasing a pressure of a cooling medium in the fuel vapour cooling arrangement or by pressurizing the fuel vapour, the cooling is implemented at least in part by a vapour-compression refrigeration system comprising the cooling medium, controlling opening and closing of a first valve arranged between the fuel tank and the fuel vapour cooling arrangement that controls flow of fuel vapour from the fuel tank to the fuel vapour cooling arrangement, and controlling opening and closing of a second valve being a three-way valve arranged between an outlet of the fuel vapour cooling arrangement, the fuel tank, and an internal combustion engine of the vehicle, wherein the second valve is controlled to selectively route liquid fuel to either of the fuel tank or the internal combustion engine depending on a fuel requirement of the internal combustion engine.

9. The method according to claim 8, wherein the method further comprises:

capturing fuel vapour not condensed in the fuel vapour cooling arrangement in an evaporative emission canister arranged between an outlet of the fuel vapour cooling arrangement and the fuel tank.

10. The method according to claim 8, wherein the fuel vapour cooling arrangement is connected to at least one of an air conditioning cooling arrangement of the vehicle or a battery cooling arrangement of the vehicle, and wherein the method further comprises heat exchange of the fuel vapour with a cooling fluid of the at least one of the air conditioning cooling arrangement or the battery cooling arrangement.

11. A system for handling fuel vapour in a vehicle, wherein the system comprises:

a fuel tank, a fuel vapour cooling arrangement connected to the fuel tank, arranged to receive fuel vapour that is evaporated from fuel that is present inside of the fuel tank, in which the evaporated fuel remains fuel vapour until it is condensed into liquid fuel within the fuel vapour cooling arrangement, wherein the fuel vapour cooling arrangement is arranged outside of the fuel tank, a valve is arranged between the fuel tank and the fuel vapour cooling arrangement to control the opening and closing of a fuel vapour cooling arrangement connection between the fuel tank and the fuel vapour cooling arrangement, and a valve arrangement connected to an outlet of the fuel vapour cooling arrangement to selectively return the liquid fuel back to the fuel tank or to purge the liquid fuel to the internal combustion engine, the liquid fuel purged to the internal combustion engine when there is an increased demand for fuel by the internal combustion engine, wherein the system is configured to condense the evaporated fuel by cooling the fuel vapour in the fuel vapour cooling arrangement, the cooling is implemented at least in part by a vapour-compression refrigeration system, and wherein increasing an amount of cooling of the fuel vapour comprises increasing a pressure of the fuel vapour.

12. The system according to claim 11, wherein the valve arrangement is further connected to the fuel tank to return the liquid fuel back to the fuel tank.

13. The system according to claim 11, wherein the valve arrangement comprises a three-way valve or a separate return valve and purge valve.

14. The system according to claim 11, wherein the system further comprises an evaporative emission canister arranged between the outlet of the fuel vapour cooling arrangement and the fuel tank.

15. The system according to claim 11, wherein the fuel vapour cooling arrangement is arranged to receive coolant from a separate cooling arrangement of the vehicle.

* * * * *